United States Patent [19]

Sonoi

[11] Patent Number: 5,446,081
[45] Date of Patent: Aug. 29, 1995

[54] COMPOSITION FOR LOW HARDNESS, FLUORINE-CONTAINING RUBBER

[75] Inventor: Takehiro Sonoi, Kitaibaraki, Japan

[73] Assignee: Nippon Mektron, Limited, Tokyo, Japan

[21] Appl. No.: 114,840

[22] Filed: Sep. 2, 1993

[30] Foreign Application Priority Data

Oct. 2, 1992 [JP] Japan .................................. 4-289434

[51] Int. Cl.⁶ .............................................. C08K 3/20
[52] U.S. Cl. ...................................... 524/251; 524/366
[58] Field of Search .................................. 524/251, 366

[56] References Cited

U.S. PATENT DOCUMENTS 4,482,476 11/1984 Yoshimura et al. ................. 524/265

FOREIGN PATENT DOCUMENTS 59-66442A 4/1984 Japan .
62-277455A 2/1987 Japan .

*Primary Examiner*—Peter D. Mulcahy
*Attorney, Agent, or Firm*—Lowe, Price, LeBlanc & Becker

[57] ABSTRACT

A composition for low hardness, fluorine-containing rubber comprising solid fluorine-containing rubber, liquid fluorine-containing rubber, an aliphatic amine having an alkyl group having at least 8 carbon atoms and a perfluoropolyether has a good mold releasability at the vulcanization molding and can produce a vulcanized product having a JIS A hardness, according to JIS K-6301, of not more than 50 and less adhesiveness to a metal.

5 Claims, No Drawings

COMPOSITION FOR LOW HARDNESS, FLUORINE-CONTAINING RUBBER

BACKGROUND OF THE INVENTION

1) FIELD OF THE INVENTION

The present invention relates to a composition for low hardness, fluorine-containing rubber, and more particularly to a composition for low hardness, fluorine-containing rubber comprising a solid fluorine-containing rubber and a liquid fluorine-containing rubber as main components and capable of producing a vulcanized product having a JIS A hardness, according to JIS K-6301, of not more than 50.

2) DESCRIPTION OF THE PRIOR ART

A vulcanized fluorine-containing rubber has good characteristics such as high heat resistance at an elevated temperature, high chemical resistance, high oil resistance, high weathering resistance, etc. and has a rapidly increasing demand in the fields of the automobile industry, the oil hydraulic industry, the general mechanical industry, the aircraft industry, etc. In addition to the above-mentioned characteristics of vulcanized fluorine-containing rubber, its low gas permeability and less generation of polluting substances have been recently recognized and its applications to gaskets, packings, etc. for electronic appliances have been now expected.

In the applications to packings for electronic appliances, a fluorine-containing rubber having a low hardness, for example, a JIS (Japanese Industrial Standards) A hardness of not more than 50, is required. However, no vulcanized fluorine-containing rubber products having a JIS A hardness of not more than 50 and good rubber physical properties can be obtained only from an ordinary solid fluorine-containing rubber even without addition of carbon black or silica usually used as a reinforcing agent.

As to lowering the hardness of a fluorine-containing rubber, Japanese Patent Application Kokai (Laid-open) 62-277456 discloses a fluorine-containing rubber composition comprising a bromine or iodine-bonded, solid fluorine-containing rubber, which is cross-linkable by a peroxide or by radiation, and a liquid fluorine-containing rubber and further discloses that the composition is suitable for forming a low hardness, thin film.

Japanese Patent Application Kokai (Laid-open) 59-66442 discloses addition of a liquid fluorine-containing rubber to a fluorine-containing rubber composition containing carbon fibers, where an increased hardness encountered when the composition contains a large amount of an electroconductive filler is adjusted by a liquid fluorine-containing rubber.

However, as to the mold releasability in the injection molding where no external mold releasing agent is applicable and the adhesiveness of the resulting vulcanized product to a metal, the prior art is not on a satisfactory level yet.

SUMMARY OF THE INVENTION

An object of the present invention is to provide a composition for low hardness, fluorine-containing rubber, which comprises a solid fluorine-containing rubber and a liquid fluorine-containing rubber as main components and can give a vulcanized product having a JIS A hardness of not more than 50, a good mold releasability even at the vulcanization molding and less adhesiveness to a metal.

DETAILED DESCRIPTION OF THE INVENTION

According to the present invention, there is provided a composition for low hardness, fluorine-containing rubber, which comprises a solid fluorine-containing rubber, a liquid fluorine-containing rubber, an aliphatic amine having an alkyl group having at least 8 carbon atoms and a perfluoropolyether.

The solid fluorine-containing rubber for use in the present invention includes known fluorine-containing rubbers having a weight average molecular weight of about 50,000 to about 300,000 (measured by gel permeation chromatography at 40° C. in a tetrahydrofuran as a solvent and expressed in terms of polystyrene; the same measurement procedure being applied hereinafter for the measurement of weight average molecular weight), for example, copolymers of vinylidene fluoride as the main component with at least one of other fluorine-containing olefins, such as hexafluoropropene, pentafluoropropene, trifluoroethylene, trifluorochloroethylene, tetrafluoroethylene, vinyl fluoride, perfluoro(acrylic acid ester), perfluoroalkyl acrylate, perfluoro(alkylvinylether), etc.; tetrafluoroethylene-propylene copolymer; tetrafluoroethylene-propylene copolymer; tetrafluoroethylene-propylene-vinylidene fluoride terpolymer, etc. Fluorine-containing rubbers, whose terminals are bonded to peroxide-vulcanizable cross-linking point monomers, or either bromine or iodine or both, can be also used in the present invention.

The liquid fluorine-containing rubber for used in the present invention includes fluorine-containing rubbers having a weight average molecular weight of about 500 to about 10,000, for example, vinylidene fluoride-hexafluoropropene copolymer, vinylidene fluoride-hexafluoropropene-tetrafluoroethylene terpolymer, etc. and about 10 to about 50% by weight, preferably about 20 to about 40% by weight, of liquid fluorine-containing rubber is used on the basis of sum total of solid and liquid fluorine-containing rubbers.

The aliphatic amine having an alkyl group having at least 8 carbon atoms for use in the present invention includes, for example, octylamine, nonylamine, N,N-dimethyloctylamine, decylamine, undecylamine, dodecylamine, tridecylamine, N,N-dimethyltridecylamine, tetradecylamine, pentadecylamine, dioctylamine, hexadecylamine, octadecylamine, N-methyldioctylamine, N-methyloctadecylamine, N,N-dimethyloctadecylamine, didecylamine, etc., among which octadecylamine and N,N-dimethyloctadecylamine are preferably used. These aliphatic amines have a good mold releasability as an internal mold-releasing agent without any use of an external mold-releasing agent. About 0.1 to about 2 parts, preferably about 0.5 to about 1 part by weight, of aliphatic amine is used per 100 parts by weight of sum total of solid and liquid fluorine-containing rubbers.

The perfluoropolyether for use in the present invention is represented by the following general formula:

$$F[CF(CF_3)CF_2O]_nCF_2CF_3$$

wherein n is an integer of 10 to 100, and about 0.5 to about 5 parts by weight, preferably about 1 to about 3 parts by weight, of perfluoropolyether is used per 100 parts by weight of sum total of solid and liquid fluorine-containing rubbers. The perfluoropolyether has a function to prevent adhesion of vulcanized products to a metal.

The present composition for low hardness, fluorine-containing rubber can further contain carbon black, silica, graphite, clay, talk, diatomaceous earth, barium sulfate, titanium oxide, etc. as a filler or a reinforcing agent. In case of carbon black or silica having a high reinforcing effect, an increase in the hardness is observable and thus it is desirable to restrict the amount of carbon black or silica to less than about 10 parts by weight, preferably less than about 5 parts by weight per 100 parts by weight of sum total of solid and liquid fluorine-containing rubbers.

Vulcanization procedure is not particularly limited, and any one of amine vulcanization procedure, polyol vulcanization procedure, peroxide vulcanization procedure, etc. can be employed with necessary additives such as a vulcanization agent, a vulcanization promoter, an acid acceptor, etc.

A cross-linking agent for use in the amine vulcanization procedure includes, for example, 4,4'-methylenebis(cyclohexylamine) carbamate, hexamethylenediamine carbamate, N,N'-dicinnamylidene-1,6-hexanediamine, etc. A cross-linking agent for use in the polyol vulcanization procedure includes, for example, polyhydroxy aromatic compounds such as 2,2-bis(4hydroxyphenyl)propane [bisphenol A], 2,2-bis(4-hydroxyphenyl)perfluoropropane [bisphenol AF], hydroquinone, catechol, resorcinol, 4,4'-dihydroxydiphenyl, 4,4'-dihydroxydiphenylmethane, 4,4'-dihydroxydiphenylsulfone, 2,2-bis(4-hydroxyphenyl)butane, etc. and their alkali metal salts or alkaline earth metal salts. A cocross-linking agent and organic peroxide for use in the peroxide vulcanization procedure are any of those usually employed. About 0.5 to about 10 parts by weight, preferably about 0.5 to 6 parts by weight, of a cocross-linking agent is used per 100 parts by weight of sum total of solid and liquid fluorine-containing rubbers, and about 0.1 to about 5 parts by weight, preferably about 0.5 to about 3 parts by weight, of an organic peroxide is used per 100 parts by weight of sum total of solid and liquid fluorine-containing rubbers.

As a vulcanization promoter, about 0.1 to about 10 parts by weight, preferably about 0.1 to about 2 parts by weight, of one of various quaternary ammonium salts and quaternary phosphonium salts is used per 100 parts by weight of sum total of solid and liquid fluorine-containing rubbers, when a polyhydroxy aromatic compound or its metal salt is used as a cross-linking agent. As an acid acceptor, about 1 to about 20 parts by weight, preferably about 3 to about 15 parts by weight, of one of various oxides and hydroxides of divalent metal is used per 100 parts by weight of sum total of solid and liquid fluorine-containing rubbers.

The present composition can be prepared by a mixing roll, etc., and vulcanization of the composition can be carried out usually by primary vulcanization (press vulcanization) and secondary vulcanization in a heating oven, and an injection molding is also applicable.

By the presence of an aliphatic amine having an alkyl group having at least 8 carbon atoms and a perfluoropolyether in the composition for low hardness, fluorine-containing rubber comprising solid fluorine-containing rubber and liquid fluorine-containing rubber as the main components and capable of producing a vulcanized product having a JIS A hardness of not more than 50, the present composition has a good mold releasability even at the vulcanization molding, and thus has a good injection moldability and less adhesiveness to a metal, and thus is applicable as molding materials for gaskets, packings, etc. in electronic appliances.

PREFERRED EMBODIMENTS OF THE INVENTION

The present invention will be explained in detail below, referring to Examples.

EXAMPLE 1

Solid fluorine-containing rubber A (for amine vulcanization procedure and polyol vulcanization procedure): vinylidene fluoride-hexafluoropropene copolymer (molar ratio=78: 22; weight avarage molecular weight: 200,000)

Solid fluorine-containing rubber B (for peroxide vulcanization procedure): vinylidene fluoride-hexafluoropropene-tetrafluoroethylene terpolymer (molar ratio=68: 16: 16; weight avarage molecular weight: 160,000)

Liquid fluorine-containing rubber: vinylidene fluoride-hexafluoropropene copolymer (molar ratio=78: 22; weight avarage molecular weight: 6,000)

Compositions consisting each of solid fluorine-containing rubbers, liquid fluorine-containing rubber and additives shown in the following Table 1 in mixing ratios in parts by weight shown also in the following Table 1 were kneaded by an 8-inch mixing roll to prepare compositions for low hardness, fluorine-containing rubber.

TABLE 1

| Mixing components | Composition No. (parts by weight) | | | | | | | | | | |
|---|---|---|---|---|---|---|---|---|---|---|---|
| | 1 | 2 | 3 | 4 | 5 | 6 | 7 | 8 | 9 | 10 | 11 |
| Solid fluorine-containing rubber A | 70 | 70 | 70 | 90 | 70 | 60 | 70 | 70 | | | |
| Solid fluorine-containing rubber B | | | | | | | | | 70 | 70 | 70 |
| Liquid fluorine-containing rubber | 30 | 30 | 30 | 10 | 30 | 40 | 30 | 30 | 30 | 30 | 30 |
| MT carbon black | 5 | 5 | 5 | 5 | 5 | 5 | 5 | 5 | 5 | 5 | 5 |
| Lead oxide | 15 | 15 | 15 | | | | | | 6 | 6 | 6 |
| Calcium hydroxide | | | | 5 | 5 | 5 | 5 | 5 | | | |
| Magnesium oxide | | | | 3 | 3 | 3 | 3 | 3 | | | |
| 4,4'-methylene bis-(cyclohexylamine)-carbamate | 2 | 2 | 2 | | | | | | | | |
| Bisphenol AF | | | | 2 | 2 | 2 | 2 | 2 | | | |
| 1-benzyl-3, 5-dimethylpyridium chloride | | | | 0.3 | 0.3 | 0.3 | 0.3 | 0.3 | | | |
| Triallyl isocyanurate (Note 1) | | | | | | | | | 10 | 10 | 10 |
| Organic peroxide (Note 2) | | | | | | | | | 2 | 2 | 2 |
| N,N-dimethyl-octadecylamine | 0.5 | 0.5 | | | | 0.5 | 0.5 | | | 0.5 | 0.5 |
| Perfluoropolyether | | 2 | | | | | 2 | | | | 2 |

(Note 1) TAIC M-60 (trademark of a product made by Nippon Kasei K.K., Japan)
(Note 2) Perhexa 25B-40 (trademark of a product made by Nihon Yushi K.K., Japan)

The thus obtained compositions low hardness fluorine-containing rubber were subjected to primary vulcanization (press vulcanization) at 180° C. for 8 minutes and then to secondary vulcanization in an oven at 230° C. for 22 hours, and the resulting vulcanized products were subjected to measurements of properties according to JIS K-6301. Compression set was measured at 25% compression and 70° C. for 70 hours for P-24 O-rings prepared by vulcanizations under the same conditions as above. Furthermore, the compositions were subjected to press vulcanization in a mold capable of integrally molding ten P-24 O-rings together with fins having a thickness of 0.06 mm at 180° C. for 8 hours without any external mold-releasing agent and it was determined whether the O-rings and the fins could be released from the mold together. This operation was repeated 5 times, and a ratio of O-rings remaining in the mold to total O-rings through 5 runs of the operation was made a percent mold release as an indicator of mold releasability. Furthermore, P-24 O-rings were placed on a copper plate having a thickness of 0.5 mm and subjected to 25% compression by pressing the rings onto the copper plate to determine their adhesiveness to the copper plate after 24 hours at 100° C., where evaluation of adhesiveness was made by three levels, i.e. no adhesion (mark O), little adhesion (mark A) and large adhesion (mark x). The results are given in the following Table 2.

TABLE 2

| Physical properties | Composition No. | | | | | | | | | | |
|---|---|---|---|---|---|---|---|---|---|---|---|
| | 1 | 2 | 3 | 4 | 5 | 6 | 7 | 8 | 9 | 10 | 11 |
| Hardness (JIS A) | 48 | 48 | 47 | 49 | 43 | 41 | 43 | 42 | 44 | 44 | 43 |
| 100% modulus (kgf/cm$^2$) | 13 | 15 | 13 | 16 | 11 | 10 | 10 | 9 | 14 | 13 | 12 |
| Tensile strength (kgf/cm$^2$) | 108 | 97 | 90 | 79 | 66 | 60 | 85 | 62 | 121 | 129 | 111 |
| Elongation (%) | 401 | 325 | 352 | 308 | 373 | 405 | 284 | 389 | 425 | 403 | 432 |
| Compression set (%) | 19 | 18 | 19 | 9 | 8 | 9 | 9 | 9 | 21 | 20 | 22 |
| Percent mold release (%) | 60 | 6 | 0 | 20 | 50 | 56 | 0 | 0 | 68 | 2 | 0 |
| Adhesiveness | x | x | o | Δ | x | x | Δ | o | x | x | o |

COMPARATIVE EXAMPLE 1

In compositions Nos. 1, 4 or 9 of Example 1, 100 parts by weight of solid fluorine-containing rubber A or B was used without using the liquid fluorine-containing rubber. The results are shown in the following Table 3.

TABLE 3

| Physical properties | Composition No. | | |
|---|---|---|---|
| | 1 | 2 | 3 |
| Hardness (JIS A) | 60 | 54 | 56 |
| 100% modulus (kgf/cm$^2$) | 16 | 15 | 18 |
| Tensile strength (kgf/cm$^2$) | 160 | 96 | 170 |
| Elongation (%) | 350 | 334 | 385 |
| Compression set (%) | 18 | 9 | 20 |
| Percent mold release (%) | 20 | 12 | 32 |
| Adhesiveness | o | o | o |

EXAMPLE 2 AND COMPARATIVE EXAMPLE 2

Compositions for low hardness, fluorine-containing rubber were prepared under the conditions given in the following Tables 4 and 5 in the same manner as in Example 1.

TABLE 4

| Mixing components | Compositions No. (parts by weight) | | | | | | | | |
|---|---|---|---|---|---|---|---|---|---|
| | 1 | 2 | 3 | 4 | 5 | 6 | 7 | 8 | 9 |
| Solid fluorine-containing rubber A | 90 | 70 | 60 | 70 | 70 | 70 | 70 | 70 | 70 |
| Liquid fluorine-containing rubber | 10 | 30 | 40 | 30 | 30 | 30 | 30 | 30 | 30 |
| MT carbon black | 5 | 5 | 5 | 5 | 5 | 5 | 5 | | |
| Graphite | | | | | | | | 5 | |
| Titanium oxide | | | | | | | | | 5 |
| Calcium hydroxide | 5 | 5 | 5 | 5 | 5 | 5 | 5 | 5 | 5 |
| Magnesium oxide | 3 | 3 | 3 | 3 | 3 | 3 | 3 | 3 | 3 |
| Bisphenol AF | 2 | 2 | 2 | 2 | 2 | 2 | 2 | 2 | 2 |
| 1-benzyl-3,5-dimethylpyridium chloride | 0.3 | 0.3 | 0.3 | | 0.3 | 0.3 | 0.3 | 0.3 | 0.3 |
| Benzyl triphenyl-phosphonium chloride | | | | 0.6 | | | | | |
| N,N-dimethylhexadecylamine | | | | | 0.5 | | | | |
| N,N-dimethyloctadecylamine | | | | | | 0.5 | 0.5 | 0.5 | 0.5 |
| Perfluoropolyether | | | | | | | 2 | 2 | 2 |

TABLE 5

| Mixing components | Comparative Composition No. (parts by weight) | |
|---|---|---|
| | 1 | 2 |
| Solid fluorine-containing rubber A | 100 | 100 |
| MT carbon black | 5 | 5 |
| Calcium hydroxide | 5 | 5 |
| Magnesium oxide | 3 | 3 |
| Bisphenol AF | 2 | 2 |
| 1-benzyl-3,5-dimethylpyridium chloride | 0.3 | |
| Benzyl triphenyl-phosphonium chloride | | 0.6 |

Results of physical properties are given in the following Tables 6 and 7.

TABLE 6

| Physical properties | Composition No. | | | | | | | | |
|---|---|---|---|---|---|---|---|---|---|
| | 1 | 2 | 3 | 4 | 5 | 6 | 7 | 8 | 9 |
| Hardness (JIS A) | 49 | 43 | 41 | 44 | 44 | 43 | 42 | 41 | 42 |
| 100% modulus (kgf/cm$^2$) | 16 | 11 | 10 | 12 | 12 | 10 | 9 | 8 | 8 |
| Tensile strength (kgf/cm$^2$) | 79 | 66 | 60 | 64 | 84 | 85 | 62 | 68 | 72 |
| Elongation (%) | 308 | 373 | 405 | 351 | 271 | 284 | 389 | 395 | 370 |
| Compression set (%) | 9 | 8 | 9 | 9 | 9 | 9 | 9 | 9 | 8 |
| Percent mold release (%) | 20 | 50 | 56 | 520 | 0 | 0 | 0 | 0 | 0 |

TABLE 6-continued

| Physical properties | Composition No. | | | | | | | | |
|---|---|---|---|---|---|---|---|---|---|
| | 1 | 2 | 3 | 4 | 5 | 6 | 7 | 8 | 9 |
| Adhesiveness | Δ | x | x | x | Δ | Δ | ○ | ○ | ○ |

TABLE 7

| Physical properties | Comparative Composition No. | |
|---|---|---|
| | 1 | 2 |
| Hardness (JIS A) | 54 | 55 |
| 100% modulus (kgf/cm$^2$) | 15 | 17 |
| Tensile strength (kgf/cm$^2$) | 96 | 93 |
| Elongation (%) | 334 | 319 |
| Compression set (%) | 9 | 9 |
| Percent mold release (%) | 12 | 14 |
| Adhesiveness | ○ | ○ |

What is claimed is:

1. A composition for low hardness, fluorine-containing rubber, which comprises:
   (A) a solid fluorine-containing rubber having a weight average molecular weight of about 50,000 to about 300,000, measured by gel permeation chromatography at 40° C. in tetrahydrofuran as a solvent and expressed in terms of polystyrene;
   (B) a liquid fluorine-containing rubber having a weight average molecular weight of about 500 to about 10,000 measured by gel permeation chromatography at 40° C. in tetrahydrofuran as a solvent and expressed in terms of polystyrene;
   (C) an aliphatic amine having an alkyl group having at least 8 carbon atoms; and
   (D) a perfluoropolyether represented by the general formula:

$$F[CF(CF_3)CF_2O]nCF_2CF_3$$

wherein n is an integer of 10 to 100.

2. A composition according to claim 1, wherein about 10 to about 50% by weight of the liquid fluorine-containing rubber is used on the basis of sum total of the solid fluorine-containing rubber and the liquid fluorine-containing rubber.

3. A composition according to claim 1, wherein about 0.1 to about 2 parts by weight of the aliphatic amine having an alkyl group having at least 8 carbon atoms is used per 100 parts by weight of sum total of the solid and liquid fluorine-containing rubbers.

4. A composition according to claim 1, wherein about 0.5 to about 5 parts by weight of the perfluoropolyether is used per 100 parts by weight of sum total of the solid and liquid fluorine-containing rubbers.

5. A vulcanized fluorine-containing rubber having a JIS A hardness, according to JIS K-6301, of not more than 50, obtained by vulcanizing a composition for low hardness, fluorine-containing rubber of claim 1.

* * * * *